United States Patent [19]

Yokouchi

[11] Patent Number: 4,631,665
[45] Date of Patent: Dec. 23, 1986

[54] MICROPROCESSOR HAVING A PROGRAMMABLE LOGIC ARRAY

[75] Inventor: Hiroshi Yokouchi, Tokyo, Japan

[73] Assignee: Oki Electric Industry Co., Ltd., Tokyo, Japan

[21] Appl. No.: 482,169

[22] Filed: Apr. 5, 1983

[30] Foreign Application Priority Data

Apr. 14, 1982 [JP] Japan .................. 57-60876

[51] Int. Cl.[4] ............................. G06F 13/38
[52] U.S. Cl. ............................................. 364/200
[58] Field of Search ... 364/200 MS File, 900 MS File

[56] References Cited

U.S. PATENT DOCUMENTS 4,112,490 9/1978 Pohlman et al. .................. 364/200
4,403,287 9/1983 Blahut et al. ..................... 364/200
4,428,047 1/1984 Hayn et al. ....................... 364/200
4,435,763 3/1984 Bellay et al. ...................... 364/200

Primary Examiner—Thomas M. Heckler
Attorney, Agent, or Firm—Wenderoth, Lind & Ponack

[57] ABSTRACT

In a microprocessor having a programmable logic array there are provided a program counter for designating an instruction data, a data bus line, a timing and control circuit for outputting an internal reset signal in response to an external reset signal, a programmable logic array that outputs a reset data signal and a reset data bus control signal by interpreting the reset signal as an instruction, and a gate circuit for sending the reset data signal to the data bus line in response to the reset data bus control signal to reset the program counter.

4 Claims, 3 Drawing Figures

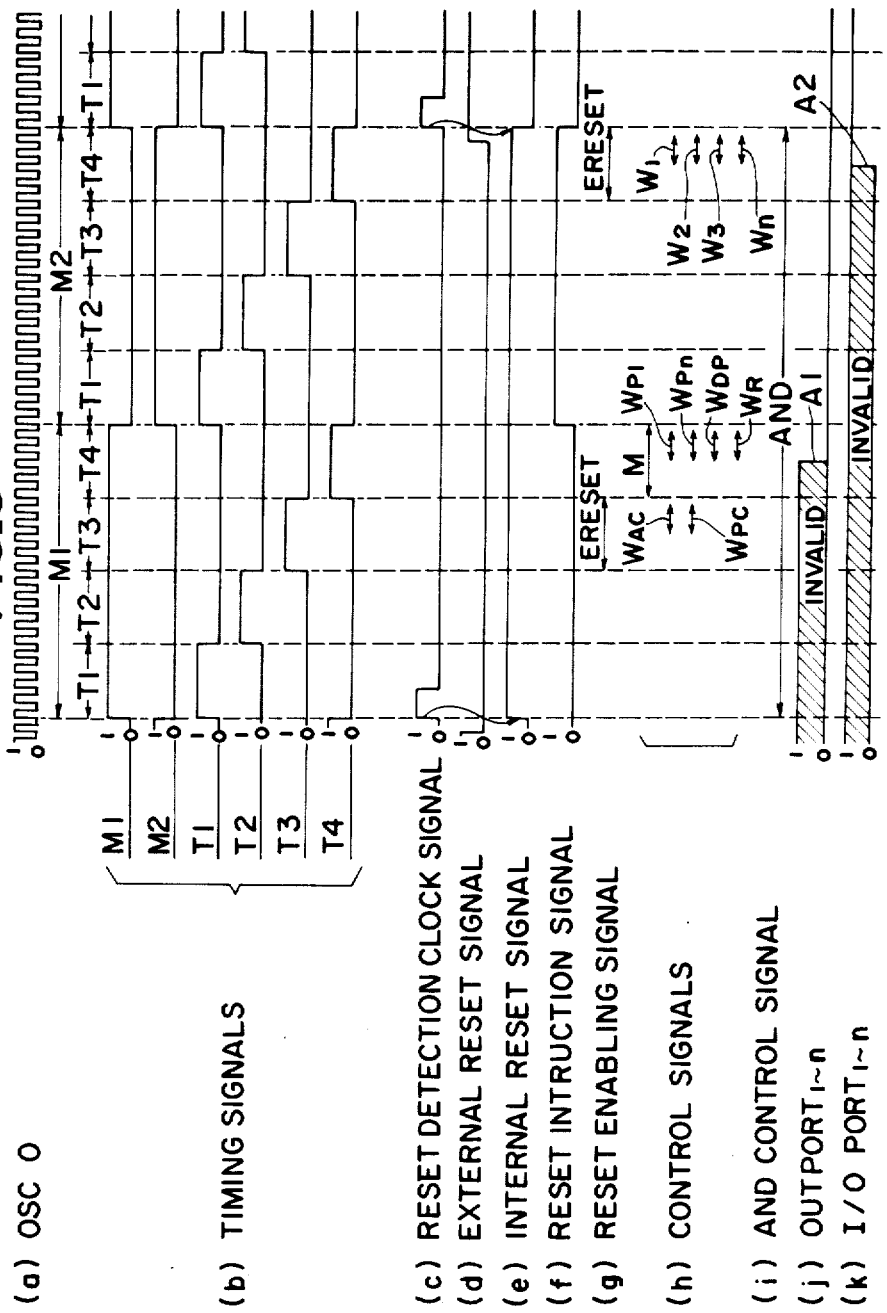

4,631,665

MICROPROCESSOR HAVING A PROGRAMMABLE LOGIC ARRAY

BACKGROUND OF THE INVENTION

This invention relates to a microprocessor and, more particularly, to an integrated circuit (IC) microprocessor having a programmable logic array.

A microprocessor constitutes the most important portion of a microcomputer, and microprocessor IC chips utilizing MOS type transistors are widely used in many industrial fields.

A prior art standard microprocessor chip consists of a plurality of control function blocks which include a Programmable Logic Array (PLA), a timing and control circuit, an Arithmetic Logic Unit (ALU), a program counter, a data pointer (data memory designation register), an output-only latch circuit, an input/output latch circuit, etc.

Each of input/output latch circuits is equipped with a set-only circuit, whereas each of a program counter, output-only latch circuits and a data pointer is equipped with a reset-only circuit. When an external reset signal is applied to a timing and control circuit, the set and reset circuits described above operate in response to an internal reset signal outputted by the timing and control circuit to initialize an IC microprocessor.

When the microprocessor is in its initial state, all the input/output ports of the input/output latch circuits become a logic "1" or an external data "read" mode, while all the output ports of the output-only latch circuits become a logic "0".

However, with the circuit construction of the prior art microprocessor described above, since it is necessary to provide exclusive reset circuits for each of the program counter, the data pointer, output-only latch circuits, and also exclusive reset circuits for the input-/output latch circuits, the circuit construction becomes complicated and the number of the circuit elements increases. Moreover, it has been difficult to readily change the initial conditions of the input/output ports and output ports according to the request of the users.

Furthermore, the aforementioned defects make the chip area larger when the circuit is fabricated of a semiconductor integrated circuit.

SUMMARY OF THE INVENTION

It is an object of this invention to provide an improved microprocessor having a decreased chip size.

Another object of this invention is to provide a novel microprocessor in which it is not necessary to possess set circuits for I/O ports and reset circuits for data latch circuits thereby simplifying the circuit construction.

Still another object of this invention is to provide a novel processor capable of setting complicated initial states without extensive modifications of the circuit construction.

According to this invention, there is provided a microprocessor comprising a program counter for designating instruction data, a data bus line, a timing and control circuit for outputting an internal reset signal in response to an external reset signal, a programmable logic array that outputs a reset data signal and a rest data bus control signal by interpreting the internal reset signal as an instruction, and a gate circuit means for inputing the reset data signal into the data bus line in response to the reset data bus control signal so as to reset the program counter.

BRIEF DESCRIPTION OF THE DRAWINGS

In the accompanying drawings:

FIG. 3 is a timing chart for explaining the resetting operation of the microprocessor embodying the invention.

DESCRIPTION OF THE PREFERRED EMBODIMENT

Figure 1:
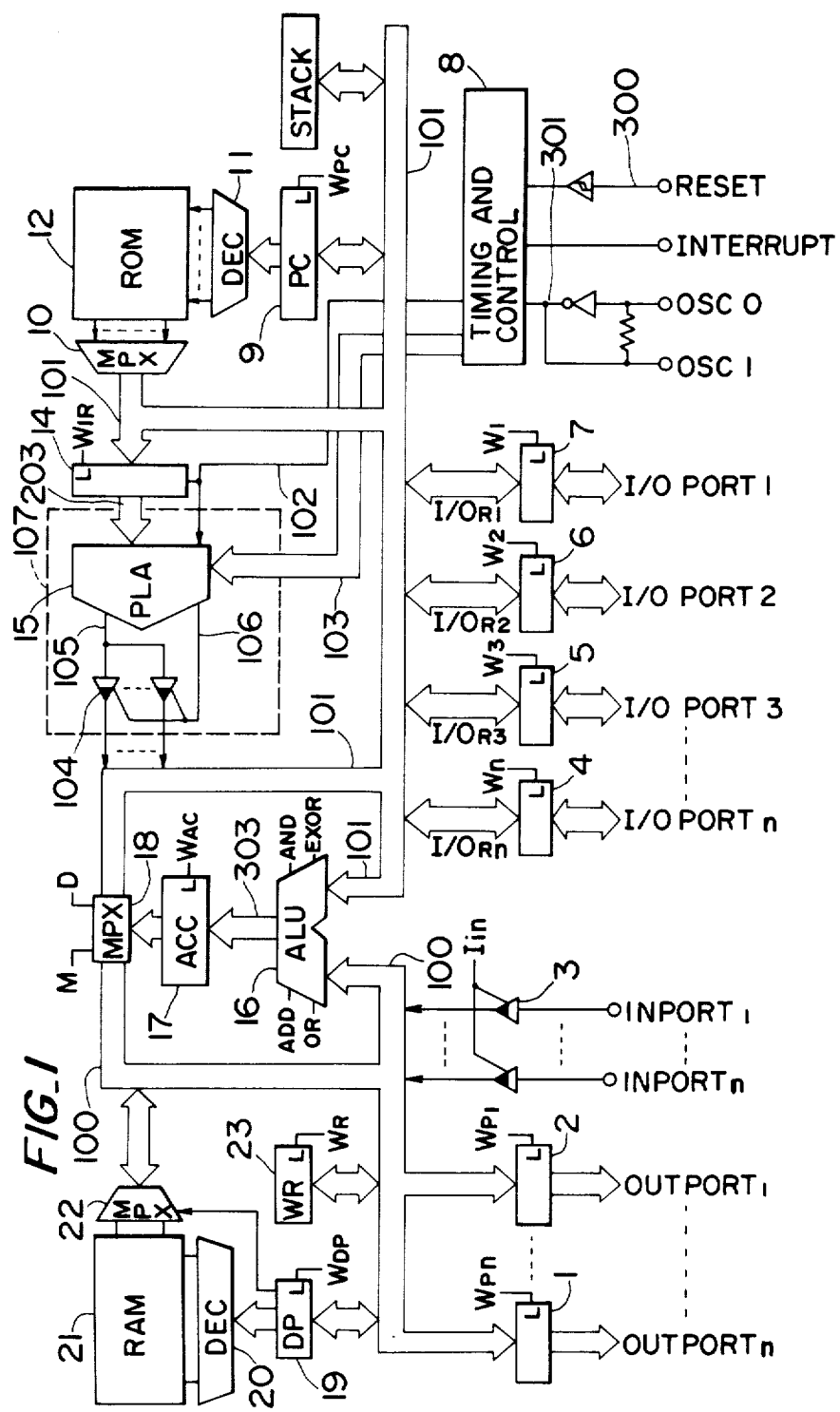
FIG. 1 is a block diagram of the microprocessor embodying the invention.

A preferred embodiment of this invention shown in FIG. 1 comprises output-only latch circuits (ports) 1 and 2 which output the contents of a memory bus line 100 to output ports $OUTPORT_{1-n}$ according to write signals $W_{p1}-W_{pn}$, respectively.

An external test-only input circuit 3 transmits the data signals at input ports $INPORT_{1-n}$ to the memory bus line 100 in accordance with a read signal $I_{in}$.

Input/output latch circuits 4–7 transmit the data at a data bus line 101 to input/output ports I/O $PORT_{1-n}$ in accordance with write signals $W_1-W_n$, and transmit the data at I/O $PORT_{1-n}$ to the data bus line 101 in accordance with read signals $I/O_{R1}-I/O_{RN}$.

An arithmetic logic unit 16, when the data of both the memory bus line 100 and data bus line 101 are inputted, performs arithmetical and logical operations in response to either an AND control signal, an OR control signal, an ADD control signal, or an EXOR (Exclusive OR) control signal.

An accumulator 17 latches the operational data 303 of ALU 16 in accordance with a write signal $W_{AC}$. A multiplexer (MPX) 18 transmits the content of the accumulator 17 to the data bus line 101 in response to an enabling signal D, whereas transmits the content of the accumulator 17 to the memory bus line 100 in response to another enabling signal M.

A data pointer 19 transmits the contents of the memory bus line 100 to a data memory device (RAM) 21 via a decoder (DEC) 20 according to a write signal $W_{DP}$. A multiplexer 22 allows the memory bus line 100 to communicate with the memory data of the data memory device 21 designated by the data pointer 19. A working register 23 temporarily stores the contents of the memory bus line 100 in response to a write signal $W_R$.

A program counter 9 designates sequentially the instruction data stored in a program memory device (ROM or RAM) 12 through a decoder 11. The program counter 9 also preferentially changes its content according to a write signal $W_{PC}$, when the instruction data for jump, interruption, call, reset, etc., are sent to the data bus line 101.

A multiplexer (MPX) 10 transmits the content of the program memory device 12 designated by the program counter 9 to an instruction register 14 via data bus line 101.

A timing and control circuit 8 generates timing signals 103 necessary to control various internal circuits in accordance with a master clock pulse signal 301 from a clock pulse generator OSC. The timing and control circuit 8 also generates an internal reset signal 102. The pulse width of the internal reset signal 102 is determined by a detection clock signal detecting the external reset signal 300.

An instruction register 14 latches the contents of data bus line 101 according to a write signal $W_{IR}$, and then transmits the contents to the output line 203.

A block circuit 107 having reset functions includes a programmable logic array (PLA) 15 and gate circuits 104. The PLA 15 outputs control signals 201 (see FIG. 2) to various circuit elements in accordance with the timing signal 103, and also generates a reset instruction signal 105 and a reset enabling signal 106 in accordance with an internal reset signal 102. The gate circuits 104 transmit reset data to the data bus line 101 in response to the reset enabling signal 106.

Figure 2:
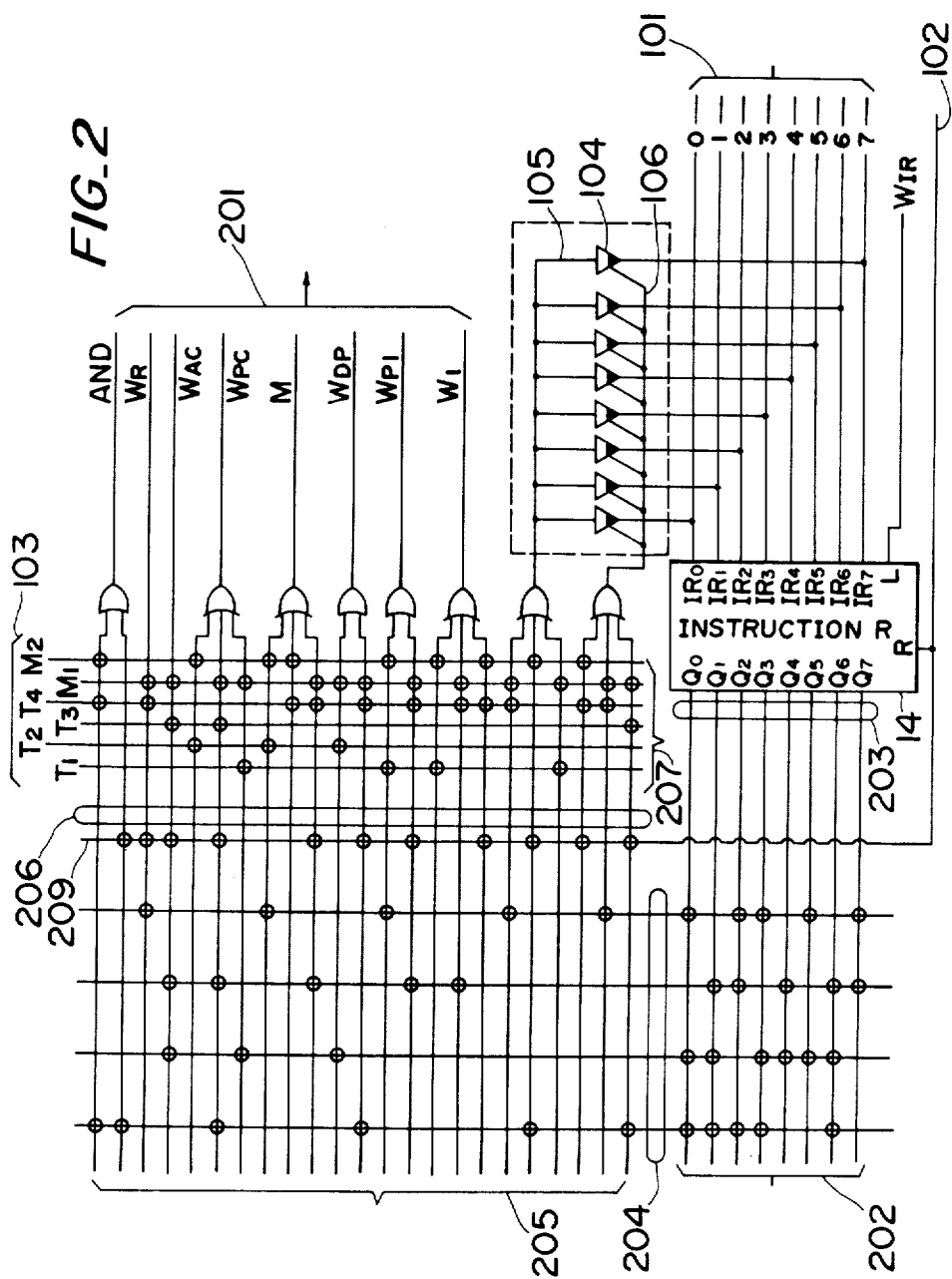
FIG. 2 is a connection diagram showing the detail including a programmable logic array of the microprocessor embodying the invention.

The detail of the block circuit 107 in accordance with this invention is shown in FIG. 2.

In FIG. 2, an AND logic matrix circuit 202 selects one of the input lines 204 according to the contents of the output line 203 of the instruction register 14.

An OR logic matrix circuit 205 produces a control signal 206 necessary to control the microprocessor in accordance with an output signal of the line 204 selected.

A timing AND logic matrix circuit 207 executes an AND logic operation of the control signals 206 of the OR logic matrix circuit 205 and the timing signals $T_1$, $T_2$, $T_3$, $T_4$, $M_1$ and $M_2$ to produce control signals 201 that control respective circuit elements in the microprocessor. The control signals 201 include AND, $W_R$, $W_{AC}$, $W_{PC}$, M, $W_{DP}$, $W_{P1}$ and $W_1$. ($W_{PN}$, $W_2$, and $W_n$ are not shown in FIG. 2)

When the internal reset signal 102 selects the line 209 of the OR logic matrix circuit 205, the timing AND logic matrix circuit 207 outputs a reset instruction signal 105 and a reset enabling signal 106 to the gate circuits 104.

The resetting operation of this invention will be explained according to FIG. 3 as follows:

At first, it should be noted that the $OUTPORT_{1-n}$ and the I/O $PORT_{1-n}$ are in given conditions, and that the timing and control circuit 8 generates clock timing signals 103 according to the master clock pulse signal 301. (See (a), (b), (j) and (k) in FIG. 3). Then, when the timing and control circuit 8 receives the external reset signal 300, it generates the internal reset signal 102 during machine cycles $M_1$ and $M_2$ in connection with the detection clock signal. (See (c), (d) and (e) in FIG. 3). The internal reset signal 102 inhibits the function of the instruction register 14, while it selects output line 209 of the OR logic matrix circuit 205 to output a control signal 206 for a reset operation. The timing AND logic matrix circuit 207 executes an AND logic operation of the control signal 206 and timing signals 103 to generate control signals 201. In this case, an AND control signal (one bit signal of the control signals 201) is directly inputted to the ALU 16 to select the AND function during the machine cycles $M_1$ and $M_2$. Furthermore, the timing AND logic matrix circuit 207 outputs an instruction signal 105 of logic "0" during the machine cycle $M_1$. When the enabling signal 106 is outputted by the timing signal $T_3$ of the machine cycle $M_1$, the gate circuits 104 send reset data of logic "0" to the data bus line 101. (See (f) and (g) in FIG. 3).

Next, when the timing AND logic matrix circuit 207 outputs write signals $W_{AC}$ and $W_{PC}$, the accumulator 17 receives the data of logic "0" on the data bus line 303, while the programmable counter 9 receives the data of logic "0" on the data bus line 101. Next, when an enabling signal M (one bit signal of the control signals 201) is outputted in response to the timing signal $T_4$ during the machine cycle $M_1$, the multiplexer 18 transmits the content of the accumulator 17 to the memory bus line 100. After this, since the control signals 201 including the write signals $W_{P1}$, $W_{PN}$, $W_{DP}$, and $W_R$ are outputted, the data on the data memory bus line 100 are sent to output-only latch circuits 1-2, the data pointer 19 and the working register 23. This results in the reset condition of the output ports $OUTPORT_{1-n}$.

Next, the reset instruction signal 105 changes to logic "1" during the machine cycle $M_2$. (See (f) in FIG. 3).

When the reset enabling signal 106 is sent to the gate circuits 104 by the timing signal $T_4$ during the machine cycle $M_2$, the reset data of logic "1" are sent to the data bus line 101. When the control signals 201 including the write signals $W_1$, $W_2$, $W_3$, $W_n$ are sent, the input/output latch circuits 4-7 latch the reset data on the data bus line 101. This results in the set conditions of the input/output ports I/O $PORT_{1-n}$.

Next, when the external reset signal 300 becomes logic "1", it is detected by the clock detection signal to make the internal reset signal in logic "0". This completes the reset operation and starts execution according to normal instructions.

In the microprocessor according to this invention, since the programmable logic array interprets a reset signal as execution instruction and then initializes the microprocessor, reset-only circuits for I/O ports and set-only circuits for data latch circuits can be completely eliminated. In addition, any initial state for particular outports and I/O ports can be easily established by changing logic intersections of both the timing AND matrix circuit 207 and the OR matrix circuit 205 in the Programmable Logic Array (PLA).

Accordingly, it is possible to simplify the construction of the microprocessor circuit and to decrease its number of the elements.

What is claimed is:

1. A microprocessor comprising: a program counter for designating instruction data, a data bus line, a timing and control circuit for outputting an internal reset signal in response to an external reset signal, a programmable logic array for outputting a reset data signal and a reset data bus control signal by interpreting said internal reset signal as an instruction, and a gate circuit means for inputting said reset data signal into said data bus line in response to said reset data bus control signal so as to reset said program counter.

2. A microprocessor according to claim 1, which further comprises a program memory device connected to said programmable logic array via a multiplexer and an instruction register controlled by a signal produced by said timing and control circuit.

3. A microprocessor according to claim 1, which further comprises an arithmetic logic unit connected to said data bus line.

4. A microprocessor according to claim 2, wherein said programmable logic array comprises: an AND matrix circuit which decodes an output of said instruction register, an OR logic matrix circuit for producing reset control signals necessary to control said microprocessor when said internal reset signal is inputted, and a timing AND matrix circuit supplied with said reset control signals produced by said OR logic matrix circuit and timing signals generated by said timing and control circuit for producing said reset data signal and said reset data bus control signal.

* * * * *